United States Patent [19]

Maeda et al.

[11] Patent Number: 4,734,792
[45] Date of Patent: Mar. 29, 1988

[54] RECORD ADDRESS DATA RECORDING APPARATUS FOR USE WITH A VTR OR THE LIKE

[75] Inventors: Eiichi Maeda, Kawanishi; Fujiaki Narita, Amagasaki, both of Japan

[73] Assignee: Ricoh Company, Ltd., Tokyo, Japan

[21] Appl. No.: 758,449

[22] Filed: Jul. 24, 1985

[30] Foreign Application Priority Data

| Jul. 24, 1984 | [JP] | Japan | 59-154628 |
| Jul. 24, 1984 | [JP] | Japan | 59-154629 |
| Sep. 7, 1984 | [JP] | Japan | 59-188539 |
| Oct. 30, 1984 | [JP] | Japan | 59-229298 |

[51] Int. Cl.$^4$ ............................................. H04N 5/76
[52] U.S. Cl. ................................. 358/335; 360/72.1; 360/72.2; 360/14.2
[58] Field of Search ............ 358/310, 319, 335; 360/14.1, 14.2, 14.3, 33.1, 37.1, 72.1, 72.2

[56] References Cited

U.S. PATENT DOCUMENTS

| 4,134,130 | 1/1979 | Tachi | 360/37.1 X |
| 4,159,480 | 1/1979 | Tachi | 358/319 |
| 4,167,759 | 9/1979 | Tachi | 360/72.2 X |
| 4,175,267 | 11/1979 | Tachi | 358/319 |

FOREIGN PATENT DOCUMENTS

2018465 10/1979 United Kingdom .............. 360/72.2

Primary Examiner—Robert L. Richardson
Attorney, Agent, or Firm—Oblon, Fisher, Spivak, McClelland & Maier

[57] ABSTRACT

A data insertion device for a recording and reproducing apparatus, which is for example with a video tape recorder (VTR) or the like, which allows one to insert data into a video tape or like recording medium while maintaining the VTR in a playback mode. While sync signals from the VTR are disturbed in the event of insertion of the search data and others, as distinguished from ordinary video data, sync signals provided by sync signal output means which is independent of sync signals provided by the VTR are used as sync signals for the insertion of the search data and others.

8 Claims, 23 Drawing Figures

RECORD ADDRESS DATA RECORDING APPARATUS FOR USE WITH A VTR OR THE LIKE

BACKGROUND OF THE INVENTION

The present invention relates to a data recording and reproducing apparatus for use with a record address video tape recorder (VTR) of the like and, more particularly, to a record address data insertion device for such an apparatus which allows one to record, or insert, address data and other desired data in a recording medium such as a video tape while maintaining the VTR in a playback mode operation. The words "address data" used herein should be understood to imply those data which are adapted to search for a desired portion of data which are carried in the recording medium.

As regards a VTR, while it is often desired to record various address data such as a date in a video tape in which video material has been previously recorded (referred to simply as a recorded tape hereinafter), switching the VTR from a reproducing mode operation to a playback mode operation is troublesome. In light of this, there has ben proposed a system which enables one to activate a recording system of a VTR while maintaining the VTR in a playback mode so as to activate a record or write head, thereby writing various types of data during several Hs (horizontal scans) of one field.

In a system of the kind described, video signals reproduced by a VTR from a recorded tape are applied to a sync separation circuit so that horizontal and vertical sync signals provided by the sync separation circuit are used as sync signals for the insertion of the data. The problem with this prior art system is that noise is generated at the beginning and end of a data insertion period due to activation of switches which are connected to a record amplifier and others of the VTR and, in addition, synchronization is disturbed over approximately ten Hs that occur before and after the insertion period due to malfuntions of the automatic gain control (AGC) circuit of a playback amplifier. The result is the distortions appearing in a television (TV) screen which prevents data from being accurately inserted into a recorded tape.

SUMMARY OF THE INVENTION

It is therefore an object of the present invention to provide a recording and reproducing apparatus for use with a VTR or the like which allows one to accurately record various types of data in any desired picture while playing back a recorded tape.

It is another object of the present invention to provide a recording and reproducing apparatus for use with a VTR or the like which promotes accurate insertion of by eliminating the influence of disturbance to synchronization which occurs during insertion of search data.

It is another object of the present invention to provide a generally improved data recording and reproducing apparatus for use with a VTR or the like.

A recording and reproducing apparatus for use with a video tape recorder (VTR) of the present invention, while a video tape with video material previously recorded therein is played back by the VTR in a playback mode, applies from an address data input control device to a record head of the VTR address data for searching for a desired frame of the video data in the video tape so as to record the address data in the video tape by insertion. The recording and reproducing apparatus comprises a sync separator circuit supplied with a video signal which is reproduced by the VTR from the video tape in a playback mode for separating sync signals from the video signal, a video signal generator circuit for adding the sync signals separated by the sync separator circuit to the address data to be inserted which is supplied from the address data input control device, a switching circuit for, while the address data is inserted into the video tape by the record head of the VTR, delivering a video signal outputted from the video signal generator circuit and, while the address data is not inserted, delivering the reproduced video signal outputted from the VTR, and a video signal transferring circuit for transferring the video signal outputted from the switching circuit to the record head of the VTR.

In accordance with the present invention, a search data insertion device for a recording and reproducing apparatus, which is used with a video tape recorder (VTR) or the like, allows one to insert address data and other desired data into a video tape or like recording medium while maintaining the VTR in a playback mode. While sync signals from the VTR are disturbed in the event of insertion of the search data and others, as distinguished from ordinary video data, sync signals provided by sync signal output means which is independent of sync signals provided by the VTR are used as sync signals for the insertion of the search data and others.

The above and other objects, features and advantages of the present invention will become more apparent from the following detailed description taken with the accompanying drawings.

DESCRIPTION OF THE PREFERRED EMBODIMENTS

While the data recording and reproducing apparatus for use with a VTR or the like of the present invention is susceptible of numerous physical embodiments, depending upon the environment and requirements of use, substantial numbers of the herein shown and described embodiments have been made, tested and used, and all have performed in an eminently satisfactory manner.

Figure 1:
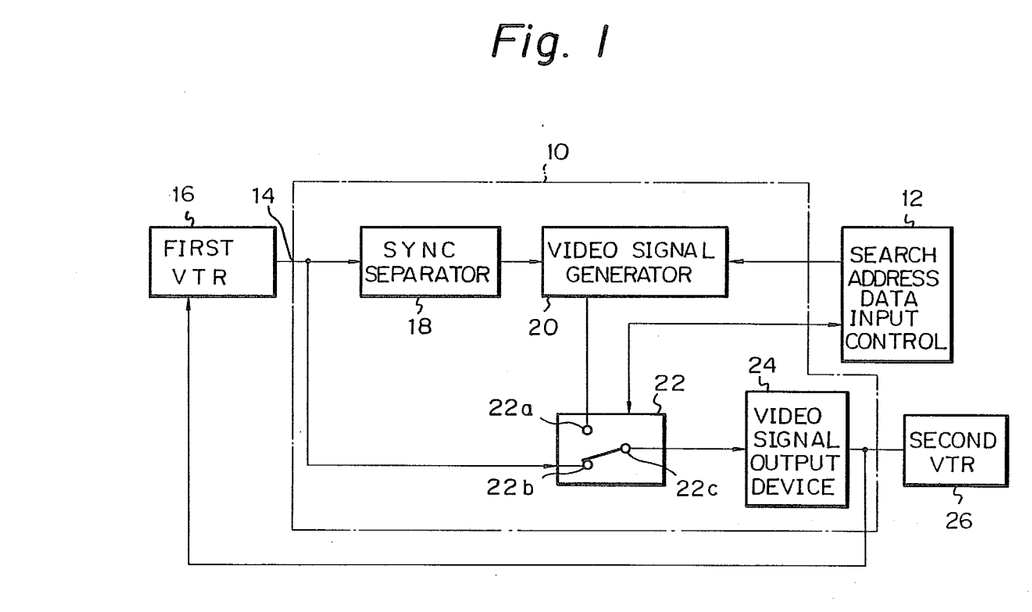
FIG. 1 is a block diagram of a data recording and reproducing apparatus embodying the present invention.

Referring to FIG. 1 of the drawings, a search address data insertion device 10 and a search address data input controller 12 in accordance with the present invention are shown and are each provided with an adapter configuration. An input terminal 14 of the insertion device 10 is connected to a VTR 16 which is adapted to playback a recorded tape, so that reproduced video signals inclusive of sync signals which are reproduced by the VTR 16 are applied to the insertion device 10. In the insertion device 10, a sync separation circuit 18 separates horizontal and vertical sync signals, or pulses, to apply them to a video signal generator 20. A address data signal is entered into the insertion device 10 from the controller 12 through ten keys or the like, the signal being routed to the video signal generator 20. The video signal generator 20 converts the address data to a video signal in a standard format and adds the sync pulses to the video signal, thereby providing a composite video signal. This signal is fed to a terminal 22a of a video switch 22. Applied to a terminal 22b of the video switch 22 is the reproduced video signals from the VTR 16.

The video switch 22 is actuated by an instruction from the controller 12 to a position for routing the signal appearing at the terminal 22a to an output terminal 22c over a specific insertion period of, for example, 20-24 Hs within one field. During the other periods, the video switch 22 is conditioned to route the reproduced video signals to the output terminal 22c. The signal applied to the output terminal 22c of the video switch 22 is formatted by a video signal output device 24 to become a signal which is suitable for recording in a VTR. The output of the device 24 is applied to the VTR 16. In this manner, data is written into a recorded tape by applying a record current to a video head of the VTR 16.

Another VTR 26 may be connected to the video signal output device 24 in a recording mode. In this condition, one may replicate or, dub, in another video tape the video signals which are reproduced by the first VTR 16 and the search address data.

Assume that the first VTR 16 is playing back a recorded tape to reproduce desired video data. As one enters search address data through ten keys or the like on the controller 12, the search address data is edited by the address data insertion device 10 and then written into a recording position of any desired video data in the tape which is being played back.

A typical example of the address data may be a number assigned to a particular track of the recorded tape. The video data which are reproduced by the first VTR 16 and the address data may be dubbed in another video tape by the second VTR 26.

Details of the address data insertion device 10 will be described with reference to FIG. 2 and so on.

Video signals RV reproduced by a head section 16a of the VTR 16 are applied to a sync separator circuit 28 of the insertion device 10 which then produces a composite sync signal CS. The composite sync signal CS is coupled to an integrator 30 and, via a switch 31, to a horizontal drive 32, the integrator 30 producing a vertical sync signal VS and the horizontal drive 32 a horizontal sync signal HS. The horizontal sync signal HS is applied to a D-type flip-flop 34 to be thereby converted to a line switch signal LS. The three sync signals VS, HS and LS are fed to a sync signal generator 36. Then, the sync signal generator 36 provides a composite sync signal $CS_2$ which is matched in phase with the input sync signals. Applied to the controller 12, the composite sync signal $CS_2$ is separated into a horizontal sync signal $HS_2$ and a vertical sync signal $VS_2$. These sync signals $HS_2$ and $VS_2$ are delivered to a counter 38 and a monostable multivibrator 40 to produce a gate pulse GP having a predetermined period. The gate pulse GP determines a position and period of recording, e.g. 20-24 Hs or 30-35 Hs. Further, a central processing unit (CPU) 44 in the controller 12 processes address dat which is entered through ten keys 42, thereby delivering address data AD as a digital signal.

The address data AD and gate pulse GP are fed to the address data insertion device 10. Specifically, the address data AD is applied to a video signal generator 46. Also applied to the video signal generator 46 are clamping pulses CP, blanking pulses BP and horizontal sync pulses $HS_3$ which are output from the sync signal generator 36, the signal $HS_3$ being routed through a pulse delay circuit 47. The video signal generator 46 adds to the address data AD sync signals which are synchronous with the video signals reproduced by the VTR 16 and matches the levels and sync signals to those of ordinary video signals. To record the address data signal, an output signal of the video signal generator 46 is routed through a frequency modulator 48, a record amplifier 50, a buffer amplifier 52 and record drive 54. The resulting recording signal formatted for VTR is applied to a rotary transformer 16b of the VTR 16 so that a recording current flows through a video head of the head section 16a to record, or insert, the address data in the recorded tape. In this case, address data is inserted during a period of 30-35 Hs and may appear on a TV screen 56 as labeled 58 in FIG. 3.

In the circuit contruction described above, the record amplifier 50, buffer amplifier 52 and record drive 54 are constantly held in an activated condition. Meanwhile, a switch 60 which is connected to an input terminal of the record drive 54 is turned on while the gate pulse GP from the monostable multivibrator 40 is absent, thereby bypassing the input signal to the record drive 54 to ground. Upon appearance of a gate pulse GP, the switch 60 is turned off to render the input signal to the record drive 54 valid so as to record address data as previously stated. Such allows even data as short as several Hs to be accurately recorded in a video tape without being influenced by the buildup time of the record amplifier and others.

Figure 4:
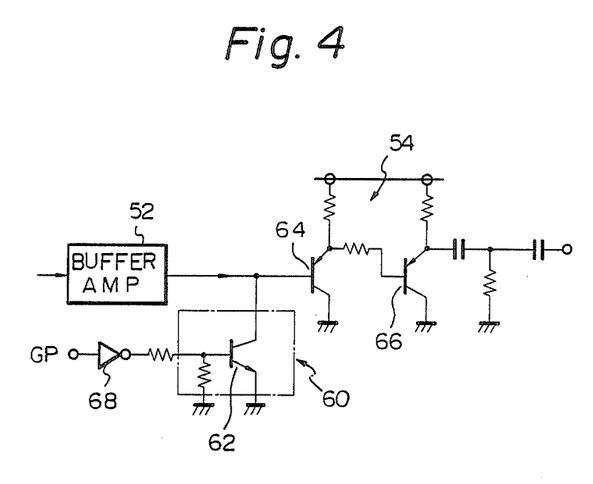
FIG. 4 shows in detail a part of the circuitry shown in FIG. 2.

As shown in FIG. 4, the switch 60 and record drive 54 may individually be implemented by transistors 62, 64 and 66. In this specific arrangement, gate pulses GP are applied to the transistor 62 via an inverter 68. While the gate pulses GP are absent, the transistor 62 is turned on to bypass a base of the transistor 64 to ground; while a gate pulse GP is present, it is turned off to render the input to the base of the transistor 64 valid.

Figure 2A:
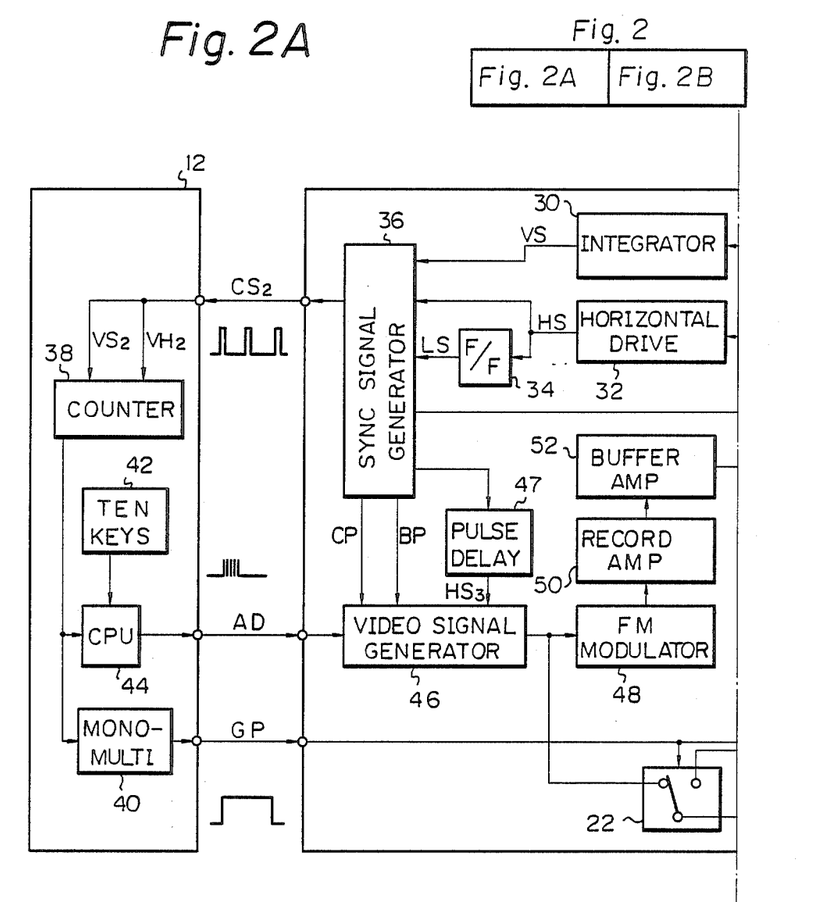
FIG. 2 shows an essential part of the apparatus of FIG. 1 in detail.
Figure 2B:
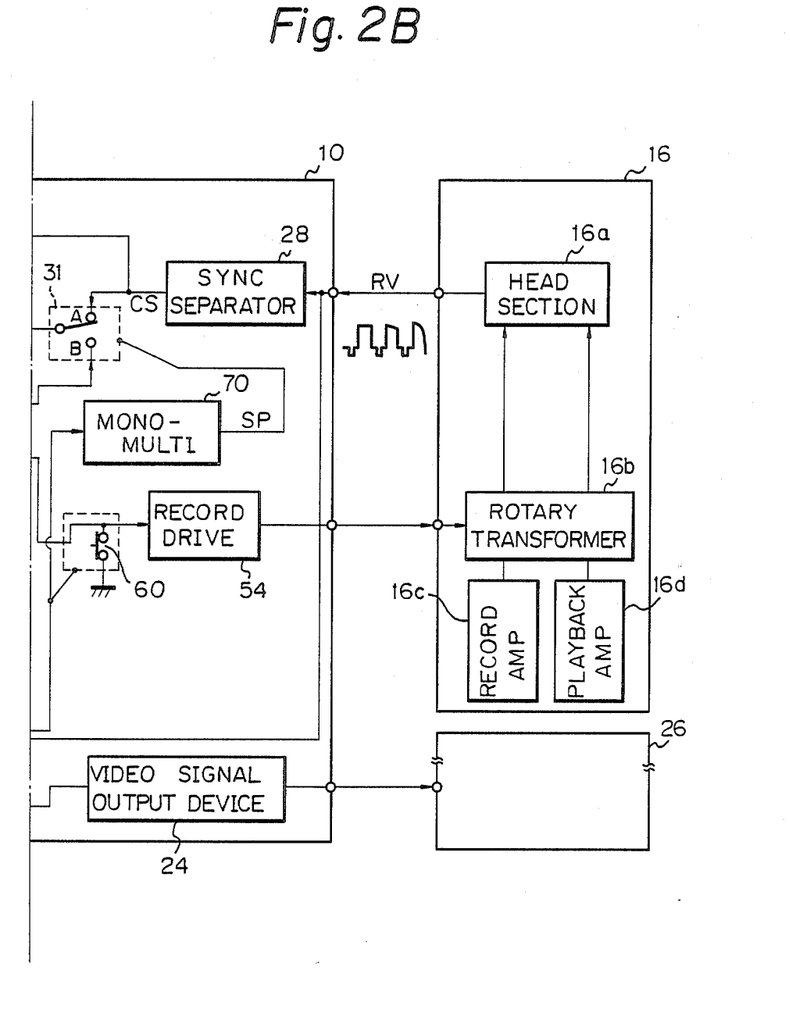
Figure 3:
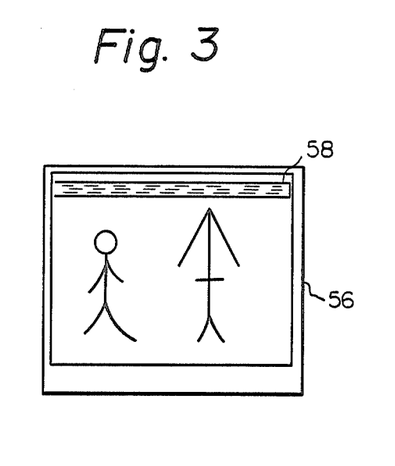
FIG. 3 shows an example of display associated with the apparatus of FIG. 2.

In the illustrative embodiment of FIG. 2, each of the address data insertion device 10 and controller 12 is provided in an adapter configuration which is free to connect to the commercially available VTR 16, as previously mentioned. Hence, even a VTR which lacks the address data inserting function is usable to insert desired address data in a recorded tape if the insertion device 10 and controller 12 are connected to the VTR.

Figure 5A:
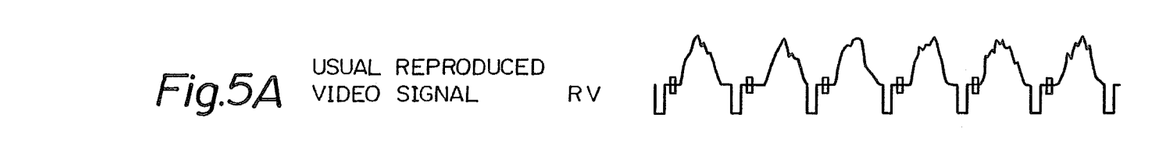
FIGS. 5A–5G show waveforms of signals appearing in the circuitry of FIG. 2.
Figure 5B:
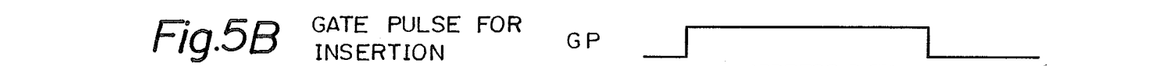
Figure 5C:
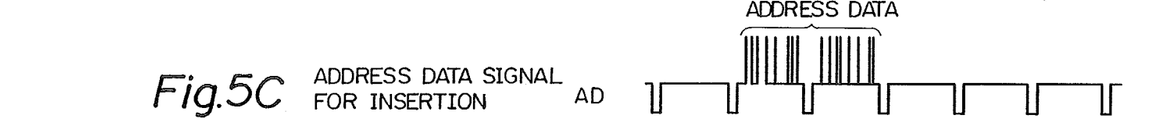
Figure 5D:
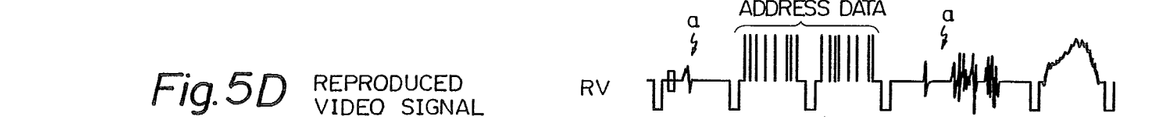

Now, while the insertion device 10 is operated to insert address data, there is a fear that pulse-like distortion waves a develop in the reproduced video signals RV as shown in FIG. 5D before the positive-going edge and after the negative-going edge of a gate pulse GP which is shown in FIG. 5B and be erroneously processed as a sync pulse to cause disturbance to synchronization. In this particular embodiment, such a problem is solved by a circuit shown in FIG. 6.

Figure 5F:
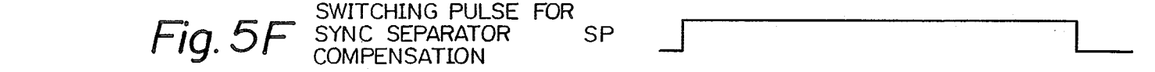
Figure 6A:
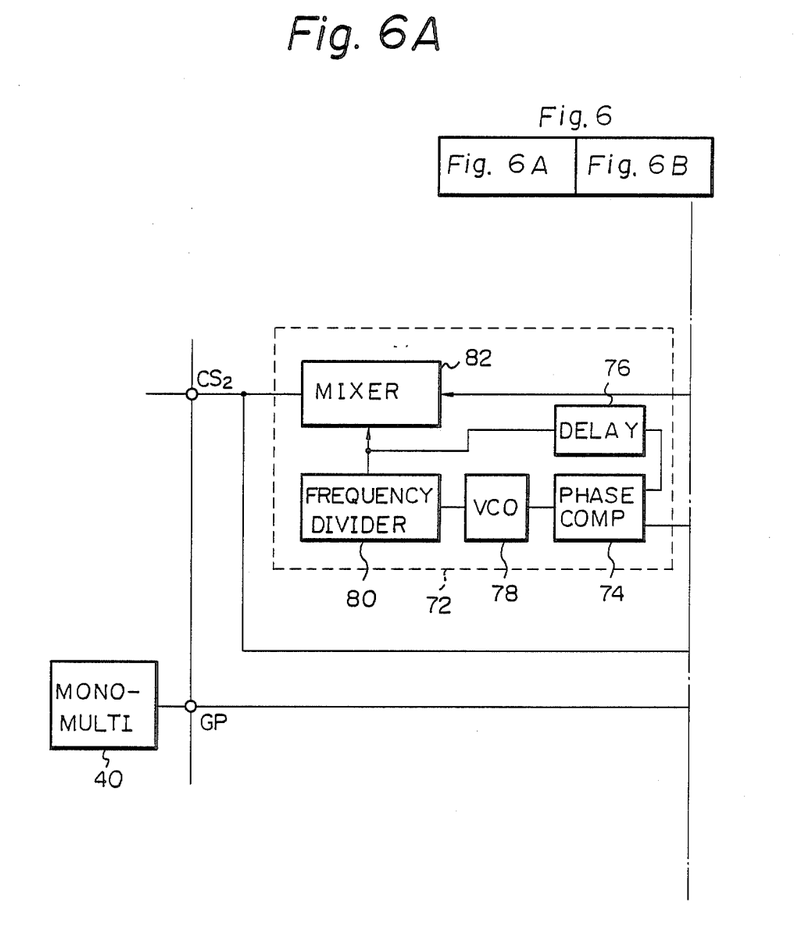
FIG. 6 is a block diagram representative of details of a sync signal generator which is included in the circuitry of FIG. 2.
Figure 6B:
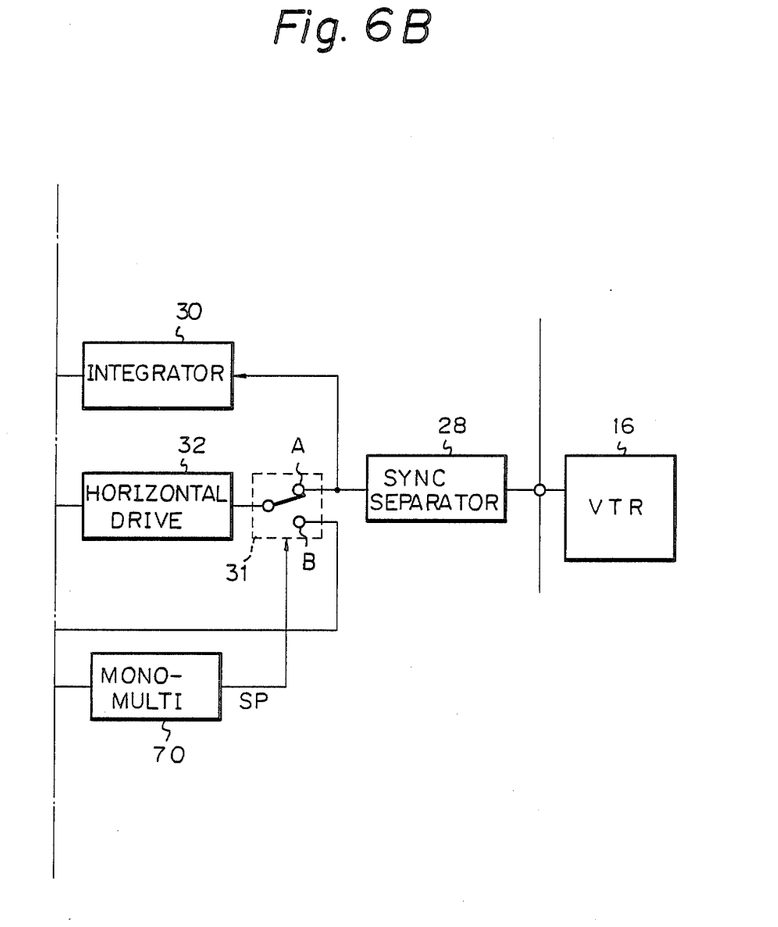

Referring to FIG. 6, a monostable multivibrator 70 is connected to the monostable multivibrator 40 and is supplied with gate pulses GP. The multivibrator 70 delivers switching pulses SP (see FIG. 5F) to the switch 31 which is disposed between the sync separator 28 and the horizontal drive 32. While the switching pulses SP are high level, the switch 31 is shifted to a contact A side and, while they are low level, to a contact B side. The output of the horizontal drive 32 is applied to one input terminal of a phase comparator 74 which is included in a phase locked loop (PLL) 72, thereby being compared with an output of the PLL 72 which is applied to the phase comparator 74 via a delay circuit 76. A voltage-controlled oscillator (VCO) 78 oscillates responsive to an output of the phase comparator 74 to produce pulses. These pulses are divided by a frequency divider 80. When the switch 31 is shifted to the contact A side, the frequency divider 80 provide pulses which are synchronous with the horizontal pulses reproduced by the VTR 16.

As the switch 31 is shifted to the contact B side, the output pulses of the PLL 72 are fed back to the phase comparator 74 by way of the horizontal drive 32 so that, even if the horizontal pulses from the VTR 16 are disturbed, the output of the PLL 72 constantly remains in the correct phase of the horizontal sync pulses. A mixer 82 mixes the output of the frequency divider 80 with the vertical sync pulses to provide a composite sync signal $CS_2$. As previously discussed, this signal $CS_2$ is separated into the horizontal and vertical sync signals $HS_2$ and $VH_2$ and then applied to the counter 38 in the controller 12. The monostable multivibrator 70 produces a switching pulse SP as shown in FIG. 5F responsive to a gate pulse GP which is generated by the monostable multivibrator 40 of the controller 12. As shown, the switching pulse SP has a longer duration than the gate pulse GP in order to cover the portions before and after an insertion period in which noise develop in the reproduced video signal (see FIG. 5D).

In the above construction, before insertion of search data, the output of the monostable multivibrator 70 remains at a low level shifting the switch 31 to the contact A side. The PLL 72 is controlled by sync signals which are reproduced by the VTR 16 from a recorded tape, thereby providing a composite sync signal. In the event of search data insertion, the output SP of the multivibrator 70 is made high level by a gate pulse GP with the result that the switch 31 is shifted to the contact B side. This routes the output of the PLL 72 to the horizontal drive 32 which then applies horizontal sync pulses to the phase comparator 74, whereby the PLL output pulses are locked in the correct phase of the horizontal sync pulses.

Figure 5E:
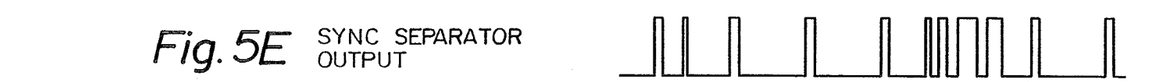
Figure 5G:
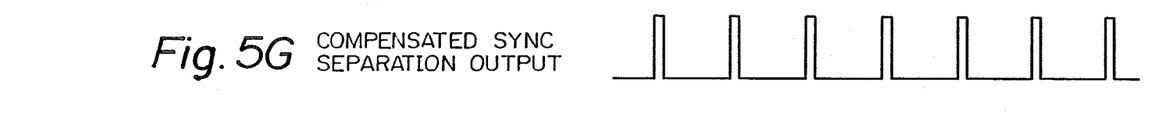

It will be seen from the above that even through the horizontal sync pulses provided by the VTR 16 may be disturbed as shown in FIG. 5E, horizontal sync pulses appear regularly from the PLL 72 as shown in FIG. 5G. Such horizontal sync pulses are delivered to the controller 12 and, hence, the horizontal sync pulses associated with a signal to be inserted are also free from disturbance.

Meanwhile, while the apparatus shown in FIG. 2 is operated to insert an address data signal or the like onto a recorded tape, the signal is passed through a filter and frequency-modulated to be thereby delayed about 2 microseconds. When the tape is played back by the VTR 16 after the insertion, horizontal synchronization of the picture will be disturbed immediately after the insertion period and a color processing circuit installed in the VTR 16 will malfunction to disturb the colors also immediately after the insertion period. This is because of the fact that due to the delay of the inserted signal the horizontal synchronization of the inserted signal and the other signals, or video signals, is deviated in phase. Disturbance to colors, therefore, will be eliminated if the horizontal synchronization of the signal to be inserted is advanced beforehand. In the illustrative embodiment, such is implemented with the pulse delay circuit 47 which is associated with the sync signal generator 36. Specifically, the pulse delay circuit 47 delays the horizontal sync signal by (1H-2 microseconds) so that horizontal sync pulses $HS_3$ which apparently are advanced by 2 microseconds are applied to the video signal generator 46. This is effective to compensate for the delay of the signal due to filter and the frequency modulation and, therefore this device can reproduce pictures without color disturbance.

Figure 7:
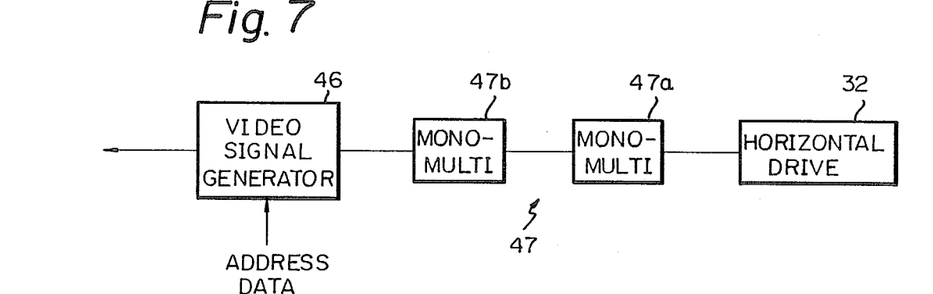
FIG. 7 is a block diagram showing a part of the sync signal generator of FIG. 2.
Figure 8A:
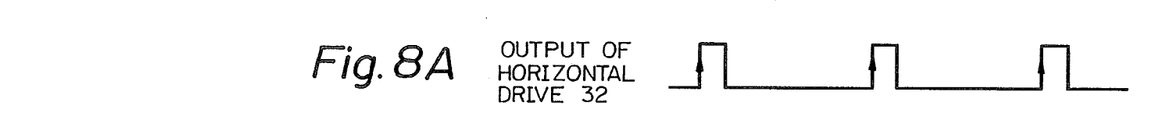
FIGS. 8A–8C demonstrate the operation of the circuitry shown in FIG. 7.
Figure 8B:
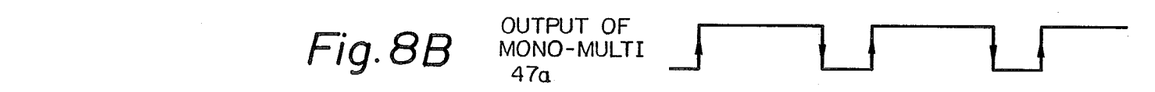
Figure 8C:
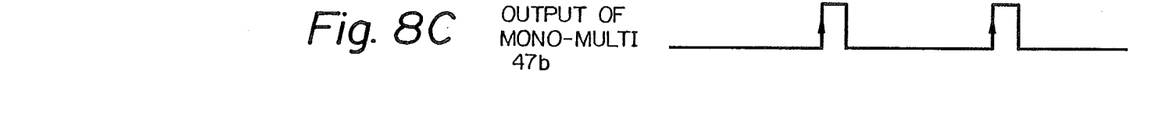

As shown in FIG. 7, the pulse delay circuit 47 may comprise a cascaded connection of monostable multivibrators 47a and 47b with the horizontal drive 32. In this particular construction, the monostable multivibrator 47a generates pulses as shown in FIG. 8B each of which rises in synchronism with the positive-going edge of an output pulse of the horizontal drive 32, shown in FIG. 8A, and then falls upon the lapse of 1H-2 microseconds. Upon the fall of this pulse, the monostable multivibrator 47b generates a pulse having a predetermined duration and advanced 2 microseconds relative to the horizontl drive output, as shown in FIG. 8C.

Figure 9:
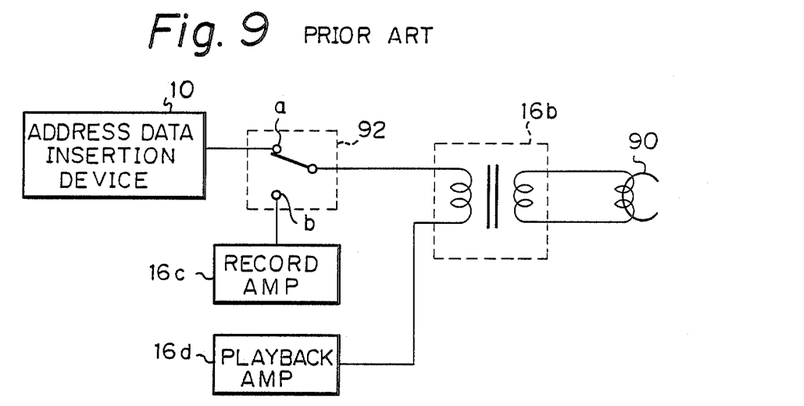
FIG. 9 is a block diagram showing a prior art rotary transformer circuit.

Referring again to FIG. 2, a video head in the head section 16a of the commercially available VTR 16 are connected to a rotary transformer 16b. Also connected to the rotary transformer 16b is a record amplifier 16c and a playback amplifier 16d. Specifically, as shown in FIG. 9, a switch 92 is connected with a primary winding of the rotary transformer 16b which is associated with a record/playback head 90. A contact a of the switch 92 is connected to the insertion device 10 and a contact b to the record amplifier 16c. This kind of connection is undesirable, however, because the switch 92 needs to have three contacts and would need to be implemented by use of a relay or the like, resulting in a bulky switch configuration.

Figure 10:
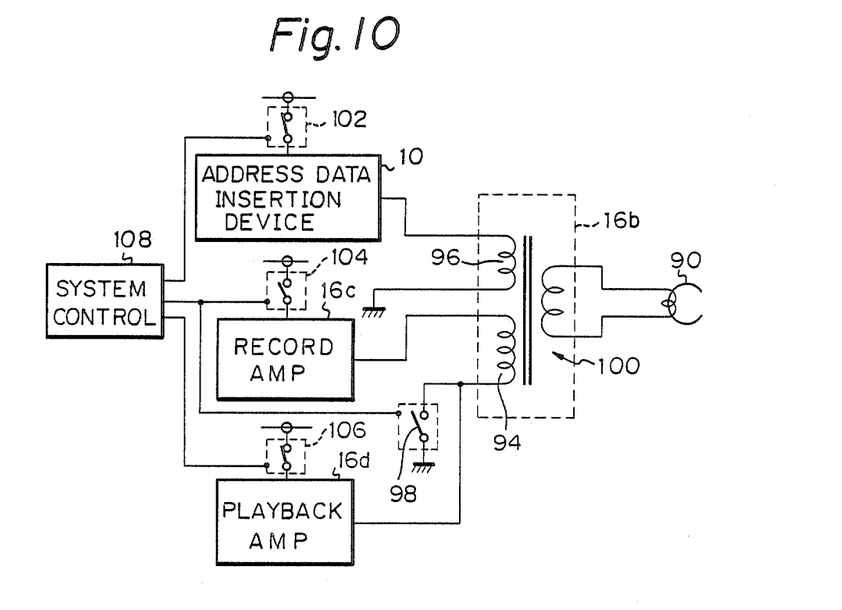
FIG. 10 is a block diagram showing a specific example of a rotary transformer circuit in accordance with the present invention.

This particular embodiment further includes an implementation for solving the above problem. As shown in FIG. 10, an ordinary record/playback winding 94 and an exclusive insert winding 96 are provided on the primary side of the rotary transformer 16b. One end of the winding 94 is connected to the record amplifier 16c which is used in the ordinary recording mode of the VTR 16, while the other end is connected to the playback amplifier 16d which is used in the ordinary playback mode and to ground via a switch 98. The winding 96, on the other hand, is connected at one end to the output terminal of the address data insertion device 10 and at the other end to ground. A secondary winding 100 of the rotary transformer 16b is connected to the video head 90.

Power source terminals of the record amplifier 16c, playback amplifier 16d and insertion device 10 are connected to a power source via switches 102, 104, and 106, respectively. The switches 102, 104 and 106 may be implemented by transistor switches and on-off controlled by control signals which are generated by a system controller 108 of the VTR 16. In the case where two record/playback heads 90 are provided in such a manner as to cover one channel each, two sets of windings will be provided on the secondary side of the rotary transformer and connected in one-to-one correspondence with the respective heads.

Figure 11:
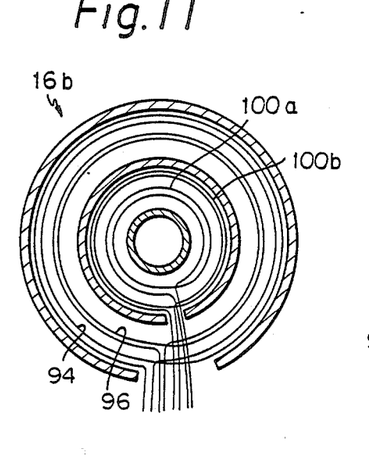
FIG. 11 is a plan view of windings of a rotary transformer included in the circuit of FIG. 10.

A specific example of the windings of the rotary transformer 16b is shown in FIG. 11.

In the construction described above, in a usual recording mode operation of the VTR 16 the switch 102 is turned off, the switches 104 and 98 are turned on, the switch 106 is turned off, the record amplifier 16c is operative, and the insertion device 10 is inoperative. A recording current is caused to flow from the record amplifier 16c through the winding 94 and switch 98. Then, a current associated with video data flows through the head 90 via the rotary transformer 16b so as to record the video data. During usual playback mode operation, the switch 102 is turned off, the switches 104 and 98 are turned off, and the switch 106 is turned on, so that reproduced signals from the head 90 are applied to the playback amplifier 16d via the rotary transformer 16a and winding 94, thereby reproducing video data out of a recorded tape.

When the VTR is conditioned for a data insertion mode through a switch or like instructing means, the system controller 108 delivers an insertion mode signal for several Hs of one field responsive to a sync signal which is provided by the playback amplifier 16d. The insertion mode signal turns on the switch 102, turns off the switches 104 and 98, and turns on the switch 106 with the result that reproduced signals from the head 90 are applied to the playback amplifier 16d via the rotary transformer 16b and winding 94. A signal to be inserted is delivered from the insertion device 10 simultaneously with the reproduced signal and during an insertion period, causing a recording current to flow through the winding 96. Consequently, the signal to be inserted is transferred to the head 90 via the secondary winding 100 of the transformer 16b and, thereby, written into a recorded tape over the several Hs of one field. As previously stated, the signal to be inserted may represent a track number. As the several Hs expire, the switch 102 is turned off to restore the VTR 16 to the ordinary playback mode.

Figure 12:
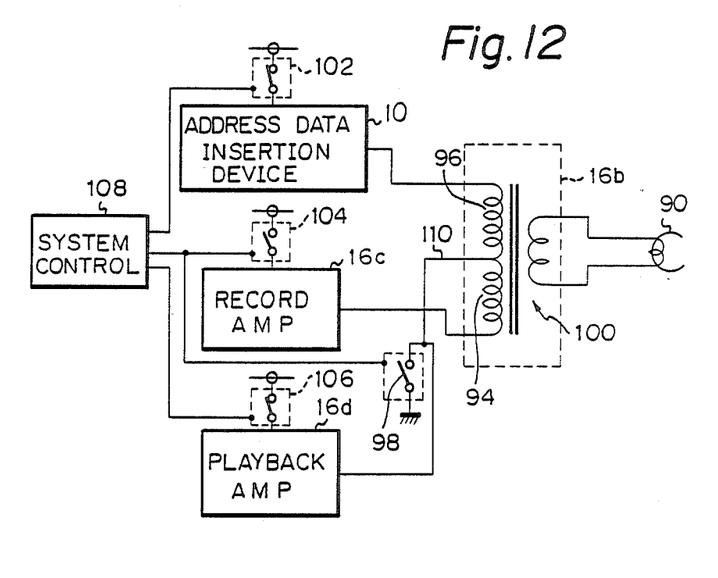
FIG. 12 is a block diagram of another specific example of the rotary transformer circuit in accordance with the present invention.
Figure 13:
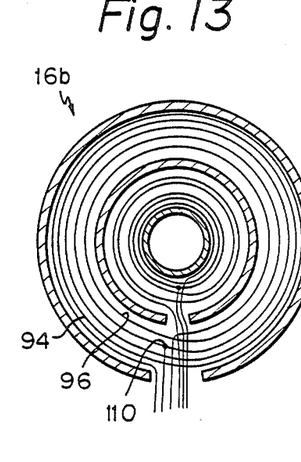
FIG. 13 is a plan view of windings of a rotary transformer included in the circuit of FIG. 12.

As shown in FIG. 12, the rotary transformer 16b may be provided with an intermediate tap 110 between the windings 94 and 96. A practical example of such a configuration is shown in FIG. 13.

Where the rotary transformer 16b with an exclusive winding for inserting a particular signal and an exclusive winding for recording usual video data is employed as shown and described, the switch for selecting an ordinary recording mode and an insertion mode can be implemented by a simple on-off switch. This eliminates the need for a relay or like bulky switch and, therby, reduces the overall dimensions of the apparatus. In addition, such a switch allows a desired signal to be inserted without affecting recording or playback of ordinary video signals.

In summary, it will be seen that the present invention provides a data recording and reproducing apparatus which insures accurate horizontal sync pulses for an address data signal, or search data, and thereby eliminates distortions of pictures, even through horizontal sync pulses from a VTR may be disturbed by noise which is generated in signals reproduced by the VTR due to selective mode switching. This advantage is derived from the unique construction in which horizontal sync pulses from a signal source independent of the horizontal sync pulses provided by the VTR (phase-locked loop in the illustrative embodiment) are used for insertion purpose. Another advantage attainable with the apparatus of the invention is that the search data can be replicated into another video tape using another VTR.

Various modifications will become possible for those skilled in the art after receiving the teachings of the present disclosure without departing from the scope thereof.

What is claimed is:

1. A data insertion device for video tape recorders comprising:
    an address data input control means;
    sync separator means supplied with a video signal which is reproduced by said video tape recorder (VTR) from the video tape in a play back mode, for separating the sync signals from the video signal;
    video signal generator means for adding the sync signals separated by said sync separator means to the data to be inserted which is supplied from the address data input control means;
    switching means for, while the address data is inserted into the video tape by the record head of the VTR, delivering a video signal outputted from said video signal generator means and, while the address data is not inserted, delivering the reproduced video signal outputted from the VTR; and
    video signal transferring means for transferring the video signal outputted from said switching means to the record head of the VTR.

2. A data insertion device as claimed in claim 1, wherein said sync separator means comprises:
    a sync separator for generating from the reproduced video signal from the VTR a first composite sync signal,
    an integrator supplied with the first composite sync signal for generating a vertical sync signal,
    a horizontal drive means for generating from said first composite sync signal a horizontal sync signal, and
    a sync signal signal generator for generating from the vertical and horizontal sync signals a second composite sync signal.

3. A data insertion device as claimed in claim 2, wherein said sync signal generator comprises:
    a phase-locked loop (PLL) circuit.

4. A data insertion device as calimed in claim 2, further comprising:
    second switching means for intercepting the sync signals and outputting the second composite sync signal to the horizintal drive circuit, during a period in which the sync signals produced from the reproduced video signal are distorted both before and after an insertion of data.

5. A data insertion device as claimed in claim 4, wherein the address data input control means is constructed to generate the address data and a gate pulse for inserting the address data responsive to a second composite sync signal and wherein the second switching means comprises a monostable multivibrator for generating a switching pulse having a longer duration than the gate pulse which is responsive to said gate pulse and a switch connected between the sync separator and the horizontal drive circuit for applying the second composite sync signal to the horizontal drive circuit responsive to the switching pulse.

6. A data insertion device as claimed in claim 5, further comprising:
a third switching means responsive to the gate pulse such that when the address data is inserted, the video signal is transferred from the switching means to the record head and, while the gate pulse is absent, interrupting the transfer of the video signal to the record head.

7. A data insertion device as claimed in claim 2, further comprising:
a delay means for delaying the horizontal sync signal from the horizontal drive circuit for a predetermined period of time.

8. A data insertion device as claimed in claim 1, wherein the VTR comprises a rotary transformer for supplying a record current associated with the video signal outputted from the switching means to the record head said rotary transformer including an exclusive primary winding for transforming the video signal and for inserting the address data into the outputted record current.

* * * * *